United States Patent [19]
Mason
[11] 3,838,219
[45] Sept. 24, 1974

[54] AUTOMATIC TELEPHONE ANSWERING DEVICE FOR USE WITH A DATA MODEM

[75] Inventor: Edwin E. Mason, Rockbridge, Ohio
[73] Assignee: MI², Inc., Columbus, Ohio

[22] Filed: Dec. 26, 1972
[21] Appl. No.: 318,523

[52] U.S. Cl. ............. 179/2 DP, 179/2 A, 179/6 AC
[51] Int. Cl. .......................................... H04m 11/06
[58] Field of Search .......... 179/2 DP, 3, 4, 2 A, 6 E

[56] References Cited

UNITED STATES PATENTS 3,301,957 1/1967 Germond .......................... 179/2 DP
3,449,720 6/1969 Marino ............................... 179/6 E
3,575,556 4/1971 Wolf ................................ 179/2 DP

*Primary Examiner*—Kathleen H. Claffy
*Assistant Examiner*—Thomas D'Amico

[57] ABSTRACT

A device physically mounted on a telephone base and extending onto the handset cradle of the base while the handset is mounted in an acoustic data coupler. The device automatically answers a ringing telephone by sensing the ring and effecting the raising of the handset cradle switch buttons. A transmitted carrier is detected by an associated modem and maintains the telephone in an off hook condition until communication is ended or until the condition of the data terminal no longer permits reception of data.

9 Claims, 2 Drawing Figures

AUTOMATIC TELEPHONE ANSWERING DEVICE FOR USE WITH A DATA MODEM

BACKGROUND

Modern communication between data terminals is conventionally accomplished by frequency shift modulation at acoustic frequencies. These communications may be over standard telephone networks. Often, data is acoustically coupled between a modem of the data terminal and the telephone handset.

In the past, such acoustic coupling was accomplished in one of two ways. First, a telephone call from a remote terminal could be manually answered by a data terminal operator. Such an operator, upon hearing or seeing the telephone ringing signal in a conventional manner, lifted the telephone handset from its cradle on the base of the telephone and subsequently positioned it in the rubber cups of a conventional acoustic coupler.

Aternatively, devices have been proposed which in effect mount the acoustic coupler on the base of the telephone at the handset and then mount the handset on the acoustic coupler. An electromechanical device is provided for automatically lifting the entire coupler and handset in order to effect raising of the handset cradle switch buttons to answer the telephone call automatically.

The first system requires the presence of an operator. The second system, although automatic, produces disadvantages and problems which in part result from the fact that the entire data coupler and handset must be lifted in order to raise the cradle switch buttons to answer the incoming calls. Because of the weight and bulk of these objects, the quality of the data coupler in these systems has been reduced. Additionally, a handset mounted on a telephone base is more likely to be subjected to mechanical disturbances or jarring and consequent interference with transmitted data.

There is therefore a need for a device which has the quality of acoustic coupling inherent in the manually operated system while also permitting the advantages of entirely automatic answering and while also maintaining the telephone handset easily available for conventional telephone voice communication.

SUMMARY

The invention is an automatic telephone answering apparatus for use with a data terminal including a modem having a carrier detector. The apparatus comprises a pickup transducer which is linked to the telephone for providing an output ringing signal in response to a ringing of a telephone. A bandpass filter is connected to the output of the transducer and tuned or otherwise adapted to have a pass band for passing ringing signals derived from the ringing. A detector means is, in turn, connected to the output of the filter and has an output for shifting logic levels in response to a ringing signal. Logic gate means is connected to the output of the carrier detector of the modem for shifting from a first to a second logic level when a ring occurs and for normally being retained at the second level by the presence of a data carrier. Electromechanical means is mechanically linked to the handset cradle buttons for effecting the raising of the headset cradle button in response to the second logic level and for effecting the lowering of said buttons in response to the first logic level. Switching means connects the output of the logic gate means to the input of said electromechanical means for applying appropriate voltages and polarities for actuating the electromechanical means.

Accordingly it is an object of the invention to provide an improved automatic answering acoustic coupler.

Another object of the invention is to provide an automatic acoustic coupler having improved quality of data coupling between the terminals modem and the telephone handset.

Another object of the invention is to provide an automatic answering acoustic coupler which permits conventional use of the telephone without interferring with the automatic answering or acoustic coupler apparatus.

Further objects and features of the invention will be apparent from the following specification and claims when considered in connection with the accompanying drawings illustrating the preferred embodiments of the invention.

Figure 1:
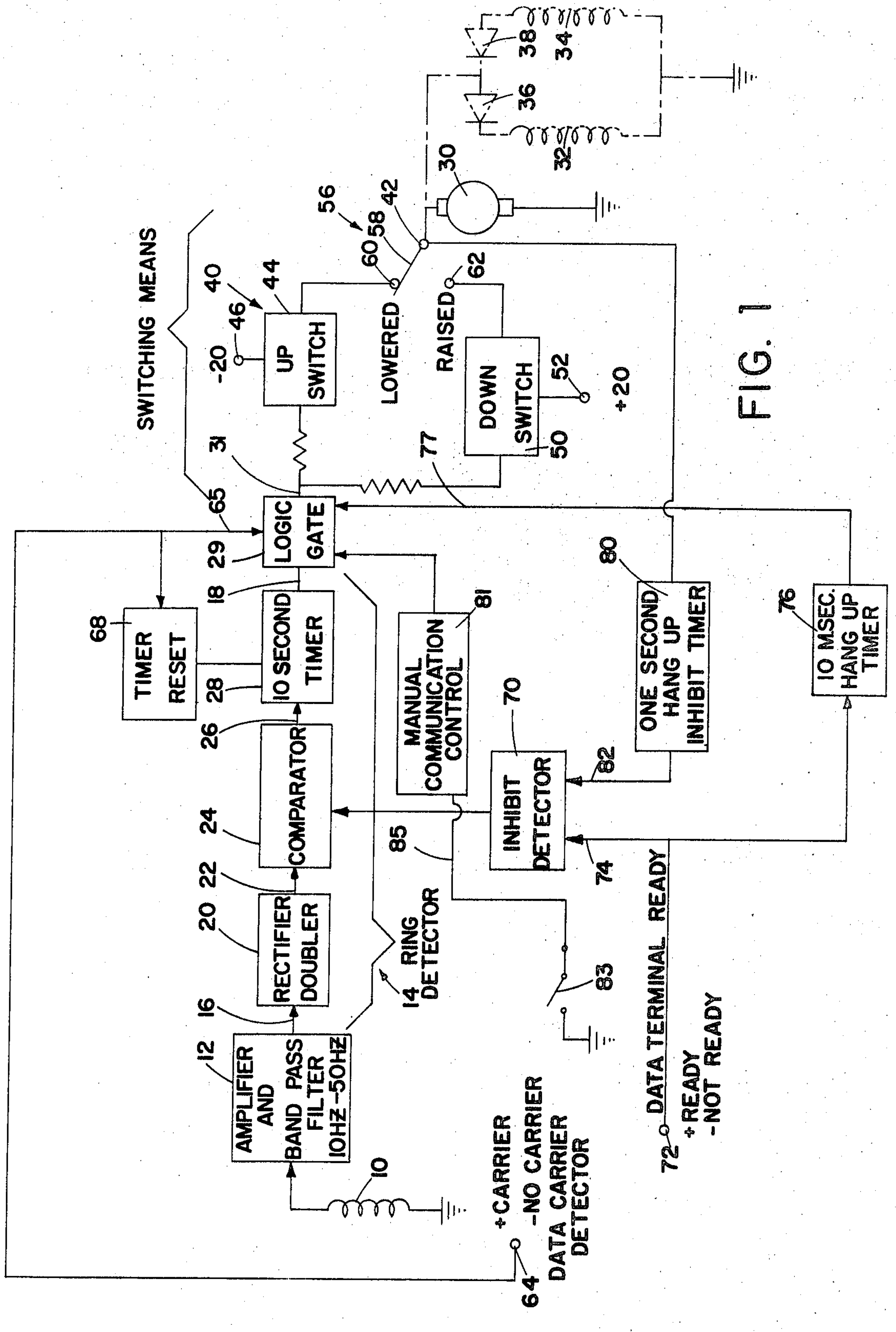
FIG. 1 is a block diagram of the preferred embodiment of the invention.

In describing the preferred embodiment of the invention illustrated in the drawings specific terminology will be resorted to for the sake of clarity. However, it is not intended to be limited to the specific terms so selected and it is to be understood that each specific term includes all techanical equivalents which operate in a similar manner to accomplish a similar purpose. For example, the word connection is often used and is not intended to be limited to direct connection but includes connection through circuit elements where the operation accomplished by such connection is equivalent and such connection would be understood as equivalent to those skilled in the art.

DETAILED DESCRIPTION

The mechanical structures which are used with the present invention but are not the subject of this application includes an acoustic coupler and an apparatus mounted on a cradle of a telephone base. The telephone handset is removed from its cradle on the telephone base and positioned in the conventional manner with the speaker and the microphone in the rubber cups of the acoustic coupler. The acoustic coupler is of course wired to the data terminal in the conventional manner and includes in one of its cups a switch, similar to the cradle switch, which is depressed when the handset is positioned on the coupler. The mechanical hangup answer apparatus is then positioned on the cradle of the telephone base in place of the handset. It has a pair of lever arms or other similar mechanical linkages which extend over the cradle switch buttons and are operated by an electric motor, solenoid or other suitable electromechanical means. The electromechanical means may be actuated either to effect the raising the cradle buttons of the telephone base so that an incoming call is answered and also may be actuated to depress these buttons to hangup the telephone i.e. to go on hook.

The data terminal with which the invention is used also has a modem connected to the acoustic coupler for modulating and demodulating the transmitted data and for controlling a part of the terminal's operation. The modem includes a carrier detector having a logic output which shifts from one level to another to indicate the presence or the absence of a carrier on the transmission line.

The electrical circuitry for controlling the mechanical apparatus and more particularly for controlling the electromechanical means is the subject matter of the present application.

The electromechanical means as well as the mechanical linkages and the electrical circuitry for controlling the electromechanical means are all preferably mounted in a single housing which is mounted on the cradle of the telephone base.

Referring now to FIG. 1, a pickup transducer 10 is mounted in this housing and linked to the telephone for providing an output ringing signal in response to a ringing of a telephone. For example, the transducer 10 is preferably a magnetic pickup, such as a coil, which is magnetically linked to the armature of the bell of the telephone and thereby picks up the 10Hz–60Hz ringing signal. Alternatively a seismic type microphone which responds to vibrations of mechanical bodys rather than air conveyed sound can be used. Such a seismic microphone would be mechanically attached to the housing which in turn is in contact with the case of the telephone base. The ring of the telephone induces mechanical vibrations in the case of the telephone which are transmitted through the housing to the vibration pickup transducer 10. The energy of such mechanical vibrations lies primarily in the frequency range from 1.2 KHz to 1.8 KHz.

The electrical signals which are derived from transducer 10 are applied to an amplifier and bandpass filter 12 having a passband in the range, of 10Hz–60Hz for a magnetic pickup and 1.2KHz to 1.8KHz for a seismic pickup. The filter 12 serves to exclude noise, vibrations, and spurious radiated energy from other sources. Of course if the magnetic pickup is used it must be mounted in a non-ferrous housing.

A detector means, indicated generally as 14, is connected to the output 16 of the filter 12 and has an output 18 for shifting from a first logic level to a second level in response to a ringing signal. In the preferred embodiment illustrated in FIG. 1, the occurrence of a positive voltage at the output 18 of the detector means 14 serves to instruct the electromechanical means to go off hook or to remain off hook in an answered condition (if already there) by effecting the raising of the cradle buttons. Similarly, a negative voltage at the detector means output 18 serves to hang up or depress the cradle buttons.

The detector means 14 includes a half wave rectifier/voltage doubler 20 connected to the output of the filter 12 which serves to half wave rectify and double the filtered signal which is derived from the telephone ringing. The rectified and doubled output at the output 22 of the rectifier 20 is applied to a high gain op-amp comparator 24. The other comparator input (not shown in FIG. 1) is biased to a comparing voltage so that the output 26 of the comparator 24 switches its logic level in response to a ringing signal; that the logic level is switched at the output 26 to indicate the occurrence of the ring when the peak voltage at the output 22 of the half wave rectifier/doubler exceeds the comparing voltage.

The output 26 of the comparator 24 is applied to a first ten second timer means 28. The output 18 of the timer 28 switches from the negative voltage to a positive voltage in response to a ringing signal and maintains the positive voltage for a 10 second period after any ring signal. It functions to maintain the output 18 of the timer 28 at a positive level during the time between ringing pulses. Although the standard ring is 4 seconds with a 2 second interval between and the timer timing must be at least therefore 2 seconds long, we prefer that it be a 10 second timing interval.

The output 18 of the timer 28 (i.e. the output of the ring detector 14) is applied to a logic gate 29. The logic gate 29 receives information and instructions from various parts of this circuit and from other parts of the data terminal. Its function is to permit the device to answer a ringing signal, to prevent the device from answering an incoming ringing signal, or to cause the device to hang up depending on the conditions of the data terminal itself and the condition of a communication.

The preferred electromechanical means which is mechanically linked to the headset cradle buttons for effecting the raising and lowering of the buttons is a dc motor 30. The dc motor 30 rotates in one direction to raise the cradle buttons when a negative polarity voltage is applied thereto and rotates in the opposite direction to depress the headset buttons when a positive voltage is applied thereto. As shown in phantom, however, the electromechanical means may alternatively comprise a pair of solenoids 32 and 34. Each solenoid is series connected to an oppositely polarized diode 36 and 38. Each series solenoid and diode pair is parallel connected to the other series solenoid and diode pair.

A switching means indicated generally as 40 connects the output 31 of the logic gate 29 to the input 42 of the electromechanical means or dc motor 30. The switching means 40 operates to apply the appropriate voltages and polarities to the dc motor 30 for actuating the dc motor 30 in response to the logic level present at the output 31 of the logic gate 29. Thus, if the logic gate 29 permits a ring to be answered, the occurrence of a ring shifts the output 31 of the logic gate 29 to a positive logic level to cause an up switch 44 to apply a negative 20 volts from a power supply terminal 46 to the dc motor 30 in order to raise the cradle buttons. Similarly, the occurrence of a negative voltage at the output 31 of the logic gate 29 causes a down switch 50 to apply a positive voltage from the power input terminal 52 to the dc motor 30 to cause depression of the cradle buttons.

The switching means 40 also includes a single pole double throw switch 56 having its wiper 58 connected to the input 42 of the electromechanical means or dc motor 30 for applying power thereto. This mechanical switch 56 is also mounted in the housing and is mechanically linked to the cradle buttons or to the linkage operating the cradle buttons so that its wiper is switched to connection with a first one 60 of its double contacts when the buttons are lowered and switched to connection with the other contact 62 of its double contacts when the buttons are raised. The switch 56 assures that only power of the proper polarity can be applied to the dc motor 30 and additionally assures that the motor will be deenergized after the completion of its travel to either depress or raise the cradle buttons.

We turn now to a consideration of the basic logic functions of the preferred embodiment of the inventor.

The output 64 of the data carrier detector in the modem is connected to an input 65 of the logic gate 29 and also is connected to a timer reset circuit 68 which resets the 10 second timer 28 whenever a carrier is initially detected. In this manner, the occurrence of a data carrier may serve to maintain the output 31 of the logic gate 29 at a proper polarity during a transmission after the phone has been answered and the ringing consequently ceases. Therefore, the telephone may normally be held in its off/hook condition during a transmission.

The data terminal is ordinarily provided with a sensing mechanism to determine whether it is in a condition to receive data. For example, the print out device may be out of paper. This circuitry is provided with an output having two logic levels to indicate whether the terminal is ready for the receipt of data or is not ready for the receipt of data. The output 72 of the data terminal ready logic circuit is connected to one input 74 of an inhibit detector 70 so that the comparator 24 is inhibited from responding to a ring when the data terminal is not in condition for receipt of data.

For similar reasons, a hang up time delay means 76 is connected between the terminal ready output 72 and the logic gate 29 for in effect hanging up the telephone of the data terminal becomes in a not ready condition during a data transmission. It switches the terminal to an on hook state. It hangs up by applying a negative voltage to the input 77 of the logic gate 29, 10 milliseconds after the data terminal ready output 72 switches to a negative logic level. A 10 millisecond time delay is provided to assure that noise spikes or other interference can not be mistaken for a not ready condition.

A hang up inhibit timer 80 connects the wiper 58 of the mechanical switch 56 to another input 82 of the inhibit detector 70 for preventing the response of the comparator 24 to a ring signal during actuation of the electromechanical means by the down switch 50 and for a one second time interval thereafter. This inhibition assures that the mechanical vibrations or the spurious electromagnetic radiation produced by the dc motor 30 or the alternative solenoids 30 or 34 can not be mistaken by the detector means 14 as a ring signal.

Finally a manual communication control circuit 81 including a six second hang up delay circuit is connected from the handset switch 83, which is mounted in a cup of the acoustic coupler, to the logic gate 29. Whenever the handset is positioned in the coupler the handset switch 83 connects the input 85 of the manual communication control circuit 81 to ground and when removed the input 85 is disconnected and floats. The hang up manual communication control circuit functions to instruct the logic gate 29 to go on hook (by switching its output level to a negative logic level) six seconds after the handset is placed in the coupler, unless in the mean time a data carrier is detected. It also causes the logic gate to go off hook whenever the handset is removed from the coupler.

This operation enables the terminal to be used for a strictly voice communication or alternatively for a voice communication followed by a data transmission.

In either case, after a voice communication, the handset is replaced in the coupler. The circuit then waits for six seconds for a data carrier. If none is received, it automatically goes on hook. If a data carrier is received the output 64 of the data carrier detector holds the terminal off hook during the data transmission. I have provided circuitry, however, so that if the data terminal is not ready to receive data, the six second delay will be omitted and the off hook condition will occur almost immediately.

The operation of the circuit of FIG. 1 begins with the output 18 of the detector means 14 at a negative voltage level when no ring is present. The occurrence of a ringing signal in the telephone to which the housing is mounted causes the vibrations or magnetic radiation from the ringing to be picked up by the transducer 10. The electrical signal derived from the transducer 10 is passed through the bandpass filter and amplifier 12, half wave rectified and doubled and applied to the comparator 24. The pulses at the output 22 of the rectifier/doubler 20 from the ringing will exceed the comparing voltage and therefore cause the output 26 of the comparator 24 to switch logic levels. This will initiate operation of the 10 second timer 28 and thereby cause the logic level at the output 18 of the detector means 14 to switch from a negative voltage to a positive voltage. Between rings, the 10 second timer will maintain this positive voltage at the output 18.

The positive voltage at the output 18 will in normal operation cause the output 31 of the logic gate 29 to switch to a positive logic level. This will cause the up switch 44 to apply a negative voltage through the mechanical switch 56 and thereby energize the dc motor 30. The dc motor will effect the raising of the cradle buttons of telephone and take the telephone off/hook.

As the dc motor 30 reaches the limit of its movement of the cradle switch buttons, the mechanical switch 56 will switch its wiper from contact with the terminal 60 to contact with the terminal 62. This will deenergize the dc motor 30 and stop its operation. The wiper 58 will remain against the contact 62 while in the raised position.

The occurrence of a data carrier within 10 seconds after the last ring will switch the data carrier detector output 64 to a positive polarity logic level which will maintain the output 31 of the logic gate 29 at its positive level. The data carrier detector will simultaneously actuate the timer reset 68 to reset 10 second timer 28.

So long as the data terminal capable of receiving data, the circuit remains in this condition during a transmission. If the carrier is lost the output 31 of the logic gate reverts to its negative level which will actuate the down switch 50 and energize the motor with a positive 20 volts. This will cause the motor to begin lowering the cradle buttons and hang up the phone.

When the positive voltage is first applied to the dc motor 30 by the down switch 50 to initiate hang up, the one second hang up inhibit timer 80 will simultaneously cause the inhibiting of the comparator 24 as described above.

If during a transmission, the data terminal becomes unable to accept further data, the 10 millisecond hang up timer 76 will switch to apply a negative voltage to the input 77 of the logic gate 29 to thereby initiate lowering of the cradle buttons and therefore hanging up of the telephone.

For manual operation a call may be initiated by merely lifting the handset from the acoustic coupler much the same as it might conventionally be lifted from a handset cradle. The handset switch 83 connects the input of the manual communication control circuit 81 to ground. The control circuit 81 switches the output of the logic gate 29 to take the terminal off hook. The caller then simply dials in the conventional manner.

After a voice communication, data may be sent or received by placing the handset back in the coupler and beginning the transmission within six seconds as described above.

Additionally after an incoming call is automatically answered, the handset may be removed for voice communication and then returned for data transmission just as described above.

Consequently, the circuit provides completely flexible and convenient use of the data terminal and telephone in either a data or voice mode.

Figure 2:
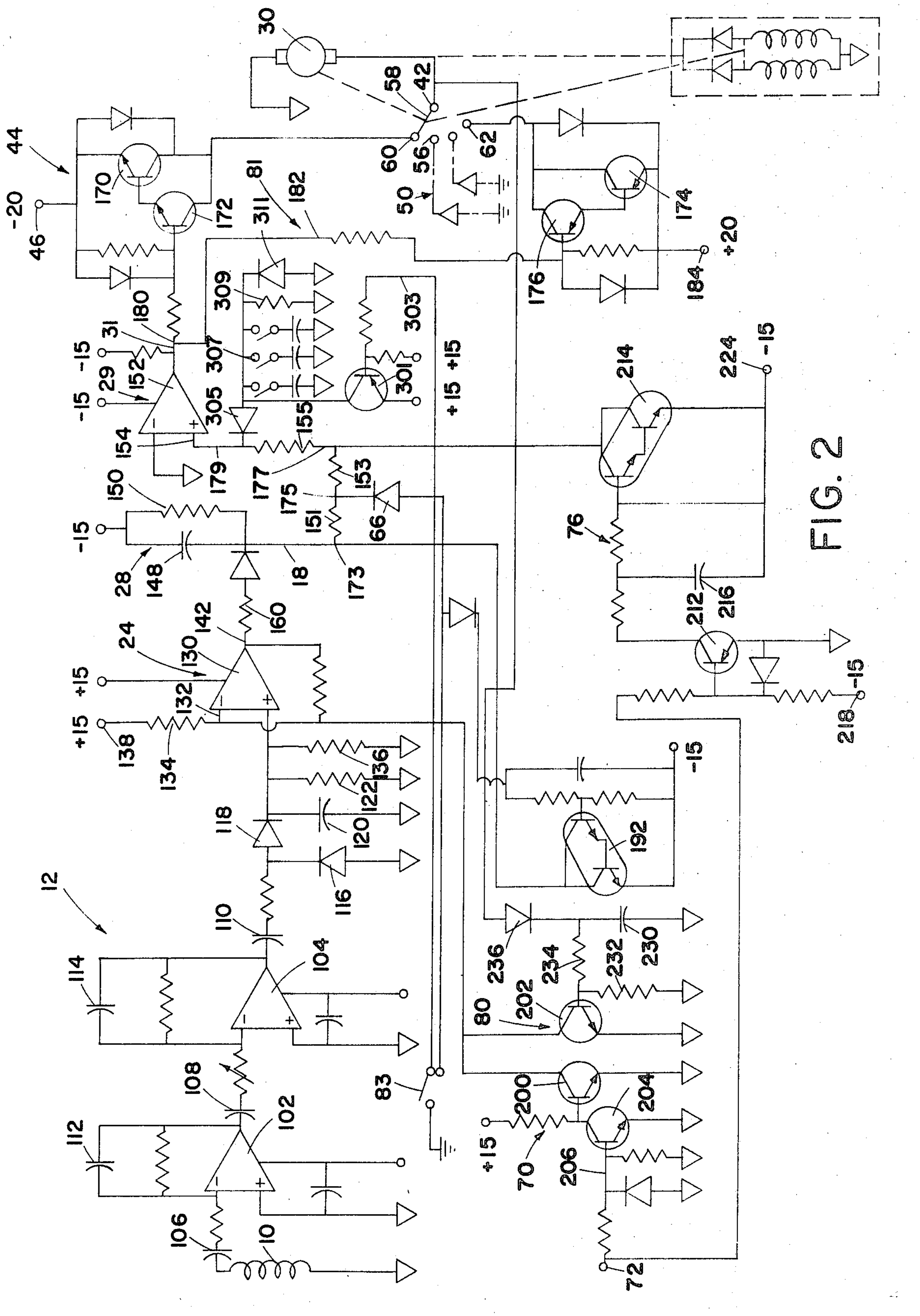
FIG. 2 is a schematic diagram of the preferred embodiment of the invention.

Referring now to the details illustrated in FIG. 2, the transducer 10 is capacitor coupled a two stage amplifier/filter comprising two op-amps 102 and 104 which are connected as linear amplifiers. They have, however, coupling capacitors 106, 108, and 110 which provides the low frequency roll or lower limit of the pass band. The higher limit or roll off for the pass band is provided by a pair of negative feedback capacitors 112 and 114.

The half wave rectifier doubler 20 comprises a pair of diodes 116 and 118, the capacitor 110, capacitor 120 and resistor 122. It operates by charging the capacitor 110 to the peak ring signal voltage during each negative half cycle while charging the capacitor 120 to the sum of the peak ring signal voltage and the charge on capacitor 110 during each positive half cycle.

The comparator 24 comprises a suitable op-amp 130 having its inverting input 132 connected between voltage dividing resistances 134 and 136. I prefer for example, to apply a +15 volt level at power supply terminal 138 and use equal resistances 134 and 136 to thereby provide a +7.5 volts at the inverting input 132. The output of the half wave rectifier doubler 120 is applied to the noninverting input 140 of the comparator 130.

The occurrence of a ring causes the capacitor 120 to being charging so that when the input voltage at the noninverting input 140 of the comparator 130 exceeds +7.5 volts, the output 142 of the comparator 130 switches from a −15 volt to a +15 volt level. The resistance 144 provides a positive feedback so that this transition is sharp as soon as the threshold is exceeded.

The 10 second timer 28 comprises a capacitor 148 and resistor 150. Its output 18 is connected to the logic gate 29 which includes op-amp 152 and series resistors 151, 153, and 155. The op-amp output level is determined by the voltage applied at its non-inverting input 154. The voltage at its non-inverting input 154 will in turn depend upon the voltages applied to the nodes of the resistors 151, 153, and 155.

Any voltage level applied to a node nearer the non-inverting input 154 will override a voltage applied at a farther node. Consequently the voltage level at the non-inverting input will be substantially whatever voltage level is applied to the nearest node to which a voltage level is applied. One or more nodes may be left floating or disconnected and consequently they have no effect. There is thereby establish a priority ranking of inputs with the highest priority inputs being closest to the non-inverting input 154. With no ringing signal, the output 142 of the comparator 130 is at a −15 volts so that the capacitor 148 has 0 volts across it. Consequently, the input 154 to the op-amp 152 is at −15 volts if not overridden by a positive voltage applied at any of the other nodes of the resistors 151, 153, and 155. Its output 156 will be at −15 volts.

Upon the occurrence of a ring signal, the output 142 of the comparator 130 will switch to a +15 volt level in response to the ring. The capacitor 148 will charge very quickly through the coupling resistor 160 to a total charge of 30 volts. The non-inverting input 154 of the comparator 152 will switch to a +15 volt level if there is no overriding voltage. This in turn will switch the output 156 of the op-amp 152 to a +15 volt level. The output 156 of the op-amp 152 will remain at the positive level so long as the input 154 is more positive than ground potential.

After ringing ceases the capacitor 148 will slowly discharge through resistance 150 and we prefer that the time for the voltage decay of the capacitor 148 to ground potential be 10 seconds.

The up switch 44 and the down switch 50 comprise darlington connected complementary transistors 170 and 172 and 174 and 176 connected with suitable biasing. A positive voltage at the input 180 of the up-switch 44 turns on the transistor 170 and applies the 20 volt negative potential from the terminal 46 through the mechanical switch 56 to the dc motor 30. Simultaneously the positive voltage cuts off the darlington pair 174 and 176.

Similarly, a negative voltage at the input 182 of the down switch 50 turns on the darlington pair 174 and 176 to apply a 20 volt positive potential from the terminal 184 through the mechanical switch 56 to the dc motor 30. Simultaneously, the negative voltage at the output 156 of the logic gate comparator 152 will cut off the darlington pair 170 and 172.

The data carrier detector output 64 is connected through the diode 66 to the node 175 of the series resistors 151, 153, and 155 and is also connected through a diode 190 to a timer reset circuit which includes a darlington transistor 192. When the carrier detector output 64 goes positive because of the occurrence of a carrier, the node 175 is held positive to override any voltage applied at the terminal 173. In this way the carrier detector, when a carrier is present, holds the non-inverting input 154 at a positive level unless overridden by a voltage applied at node 177 or 179 or directly to the input 154. This maintains an off hook state. Additionally the darlington pair 192 is switched to conduction which immediately connects the capacitor 148 to the −15 volt power supply and thereby immediately discharges the capacitor 148.

It might additionally be noted that one purpose of resetting the 10 second timer immediately upon the receipt of a carrier is so that the telephone may be brought immediately to an on/hook condition if carrier ceases within the 10 second interval. I have thereby eliminated the possibility that the circuit will answer an incoming ring, receive carrier and then if carrier is immediately lost still remain off/hook for the remainder of the 10 second time delay.

The inhibit detector 70 comprises a pair of transistors 200 and 202 which, when either conducts, connect the non-inverting input 140 of the comparator 130 to ground so that its output can not switch in response to a ring signal.

The transistor 200 is controlled by a transistor 204 having its input 206 connected to the data terminal ready output 72. When the data terminal ready output 72 is at a positive logic level and indicating the terminal may accept data, the transistor 204 is turned on and therefore the transistor 200 is not conducting. However, when the data terminal ready output 72 switches to a negative level because the terminal can not accept data, the transistor 204 is turned off thereby turning on the transistor 200 to connect the input 140 of the comparator 130 to ground and inhibit its reaction to a ringing signal.

Additionally, the data terminal ready output 72 is connected to a transistor 212 which with the darlington transistor 214 forms the 10 millisecond hang up timer 76. Timing capacitance 216 and its associated resistances are designed so that a negative logic level or a positive level below a nominal 2.9 volts at the data terminal ready output 72 will switch the transistor 212 to a conducting state. This will initiate the charging of capacitance 216 from the power supply 218. As the capacitance 216 begins charging the potential at the input 220 of the darlington transistor 214 begins going positive. After a brief delay of, for example, 10 milliseconds, the darlington transistor 214 begins conducting and connects the negative 15 volt power supply 224 to the node 177 of the series resistors 151, 153, and 155. This will, of course, unless overridden by a voltage applied directly to the non-inverting input 154, initiate the hanging up of the telephone by switching the output 156 of the comparator 152 to a negative level.

The transistor 212 is biased to go into conduction below 2.9 volts so that if the cable which connects the data terminal ready terminal 72 to the modem is ever disconnected, the floating level will be interpreted to mean that the data terminal is not ready for operation.

The one second hang up inhibit timer 80 comprises a timing capacitance 230 and resistances 232 and 234. The capacitance 230 is connected by diode 236 to the wiper terminal 42 of the mechanical switch 56.

The application of a positive voltage to the dc motor 30 at the wiper 42 (which effects an on hook condition) turns on the transistor 202 causing the non-inverting input 140 of the comparator 130 to be pulled to ground in order to inhibit the comparator from responding to a ringing signal. After the positive voltage ceases to be applied to the dc motor the capacitor 230 will begin charging but will maintain the transistor 202 in conduction, for a suitable time delay such as 1 second. The comparator will thereby be held inhibited during hang up and for 1 second thereafter.

In FIG. 2 I illustrate an alternative form for the switch 56 using a pair of simultaneously operable switches each of which has two positions. They are illustrated in phantom in FIG. 2 and work together as previously described. However, one either connects the motor 30 to the up switch or to a diode while the other connects the motor 30 either to the down switch or to another diode. In this manner the motor 30 is quickly braked to a stop following its operation.

Finally the manual communication control circuit 81 comprises a transistor 301 with its input 303 connected to the handset switch 83 and its collector connected through a diode 305 directly to the non-inverting input 154 of comparator 152. A six second time delay circuit is also connected to the diode 305 and comprises timing capacitor 307, discharge resistor 309 and diode 311.

Whenever the handset is positioned in its acoustic coupler the switch 83 is open and therefore transistor 301 is non-conducting. However, when the handset is removed for use from the coupler, the switch 83 closes to turn transistor 301 on. This simultaneously charges capacitor 307 to a +15 volt level and also applies a +15 volt level to the non-inverting input 154 of the op-amp 152. Such a positive level at input 154 effects an off hook state.

When the handset is returned to the coupler the switch 83 opens and transistor 301 ceases conducting. However, input 159 is maintained at a positive level, to maintain the off hook state, until capacitor 307 discharges. This discharge preferably takes 6 seconds after which the entire manual communication control circuit is effectively disconnected from the circuit.

If, however, darlington transistor 214 is conducting because the terminal is not ready to receive data, then capacitor 148 can discharge not only through resistor 150 but more importantly through resistors 151 and 153. This parallel discharge path greatly reduces the discharge time to approximately one half second. This causes almost immediate switching to an off hook state.

It is to be understood that while the detailed drawings and specific examples given describe preferred embodiments of the invention, they are for the purpose of illustration only that the apparatus of the invention is not limited to the precise details and conditions disclosed and that various changes may be made therein without departing from the spirit of the invention which is defined by the following claims.

What is claimed is:

1. An automatic telephone answering apparatus for use with a data terminal including a modem having a carrier detector, said apparatus comprising:

a. a pickup transducer linked to said telephone for providing an output ringing signal in response to ringing of said telephone;

b. a bandpass filter connected to the output of said transducer and adapted to have a passband for passing ringing signals derived from said ringing;

c. a detector means connected to the output of said filter and having an output for shifting logic levels in response to said ringing signals;

d. logic gate means connected to the output of said carrier detector and to the output of said detector means for at times shifting from a first to a second output logic level whenever a ringing signal occurs or whenever a carrier is present;

e. electromechanical means mechanically linked to the headset cradle switch for effecting the raising of said switch in response to said second output logic level and for effecting the lowering of said switch in response to said first logic output level; and f. switching means connecting the output of said logic gate means to the input of said electromechanical means for applying appropriate voltages and polarities for actuating the electromechanical means;

g. said switching means comprising a single pole, double throw mechanical switch having its wiper connected to said electromechanical means for applying power thereto, said switch having a mechanical actuating means linked to said headset cradle switch for having its wiper switched to connection with a first one of its double contacts when said cradle switch is lowered and switched to connection with the second of its double contacts when said cradle switch is raised;

h. an up switch means having its principal terminals connected between said first switch contact for one of said switch positions and a source of power of one polarity and having a control input connected to said output of said detector means for actuating the electromechanical means to effect raising of said cradle switch in response to said second logic level; and i. a down switch means having its principal terminals connected between the other switch contact and a source of power of the opposite polarity and having a control input connected to said output of said detector means for actuating the electromechanical means to effect lowering of said cradle switch in response to said first logic level.

2. An apparatus according to claim 1 wherein said detector means comprises:

a. a half wave rectifier doubler connected to the output of said filter;

b. a high gain, op-amp comparator having one input connected to the output of said rectifier-doubler and having the other input connected to a source of comparing voltage for switching its output voltage in response to said ringing signal; and c. a first timer means connected to the output of said comparator and having an output for switching to said second logic level in response to said ringing signal and for maintaining said second level for at least a standard time interval between ringing signals.

3. An apparatus according to claim 1 wherein said up switch means and down switch means comprise complementary transistors connected as electronic switches and having their control inputs connected to the output of said detector means.

4. An apparatus according to claim 1 wherein said detector means comprises:

a. a half wave rectifier doubler connected to the output of said filter;

b. a high gain, op-amp comparator having one input connected to the output of said rectifier-doubler and having the other input connected to a source of comparing voltage for switching its output voltage in response to said ringing signal; and c. a first timer means connected to the output of said comparator and having an output for switching to said second logic level in response to said ringing signal and for maintaining said second level for at least a standard time interval between ringing signals.

5. An apparatus according to claim 4 wherein said apparatus further comprises:

a. an inhibit circuit means having an output connected to said comparator for at times preventing a response to a signal at said one input to said comparator; and b. a hang up inhibit timer means connecting the wiper of said mechanical switch to an input of said inhibit circuit means for preventing the response of said comparator to a signal during actuation of said electromechanical means by said down switch and for a selected time interval thereafter.

6. An apparatus according to claim 4 wherein said data terminal is provided with a terminal ready logic output terminal which provides a first logic level when said terminal is in suitable condition for receipt of data and provides a second logic level when it is not in said condition and wherein said apparatus further comprises:

a. means connecting the output of said terminal ready logic output terminal to an input of said inhibit circuit means for preventing response of said comparator to signal when said data terminal is not in condition for receipt of data; and b. time delay means connected between said terminal ready output and said logic gate means for switching the output of said logic gate means to said first logic level a selected time interval after said data terminal becomes not in condition for receipt of data for effecting the depression of said cradle switch.

7. An apparatus according to claim 6 wherein said apparatus further comprises:

a. an inhibit circuit means having an output connected to said comparator for at times preventing the response of said comparator to a signal at said one input of said comparator; and b. a hang up inhibit timer means connecting the wiper of said mechanical switch to an input of said inhibit circuit means for providing the response of said comparator to a signal during actuation of said electromechanical means by said down switch and for a selected time interval thereafter.

8. An apparatus according to claim 1 wherein said logic gate means comprises a comparator having one of its inputs terminals grounded and the other of its inputs connected to three resistors which are series connected between the output of said detector means and said other input.

9. An apparatus according to claim 8 wherein said output of said carrier detector is connected by a diode to one intermediate node of said series resistors, wherein time delay means is connected between said terminal ready output and said logic gate means for switching the output of said logic gate means to said first logic level a selected time interval after said data terminal becomes not in condition for receipt of data for effecting the depression of said cradle switch and wherein a manual communication control circuit means is connected between a handset switch in an acoustic coupler and said other input of the comparator of said logic gate means for switching the output of said logic gate means to said second logic level when said handset is removed from said coupler and for effectively being electrically disconnected from said logic gate means a selected time interval after the handset is replaced in said coupler.

* * * * *